(12) United States Patent
Kato (10) Patent No.: US 6,250,462 B1
(45) Date of Patent: Jun. 26, 2001

(54) BOOK-LIKE DISC CASING

(75) Inventor: Hirotaka Kato, Tokyo (JP)

(73) Assignee: Tokyo Bijutsu Shikou Jigyou Kyoudou Kumiai, Tokyo (JP)

( * ) Notice: Subject to any disclaimer, the term of this patent is extended or adjusted under 35 U.S.C. 154(b) by 0 days.

(21) Appl. No.: 09/434,933

(22) Filed: Nov. 5, 1999

(30) Foreign Application Priority Data

Nov. 17, 1998 (JP) ................................. 10-326601

(51) Int. Cl.[7] .................................. B65D 85/57
(52) U.S. Cl. ........................ 206/312; 206/308.1
(58) Field of Search ................... 206/232, 307, 206/309, 308.1, 311, 312, 472; 281/31, 56

(56) References Cited

U.S. PATENT DOCUMENTS 4,640,413 * 2/1987 Kaplan et al. .................. 206/232
5,690,220 * 11/1997 Swan .......................... 206/308.1
5,772,019 * 6/1998 Reed .......................... 206/308.1
6,016,907 * 1/2000 Dreier ......................... 206/232
6,068,116 * 5/2000 Bankhead ...................... 206/232

* cited by examiner

*Primary Examiner*—David T. Fidei
(74) *Attorney, Agent, or Firm*—Arent Fox Kintner Plotkin & Kahn, PLLC (57) ABSTRACT

Disclosed is a book-like disc casing which comprises a series of a front cover, a spine and a rear cover, made of cardboard, and a plurality of pieces of paper, the front cover, spine and rear cover being folded to be like a book with the pieces of paper interleaved between the front cover and the rear cover. At least one of the front and rear covers has an intermediate member and a lining member laid on each other to form a lamination inside. The intermediate member has a disc accommodating space formed therein, and the lining member has a line of perforations and creases intercepting the line of perforations, which is partly in conformity with the disc accommodating space, thereby facilitating the making of an opening in the lining member to permit the taking-out of the disc from the disc accommodating space.

4 Claims, 9 Drawing Sheets

BOOK-LIKE DISC CASING

BACKGROUND OF THE INVENTION

1. Field of the Invention

The present invention relates to a disc casing for containing a compact disc (hereinafter abbreviated as CD) or a memory disc such as a CD-ROM.

2. Related Arts

Figure 16:
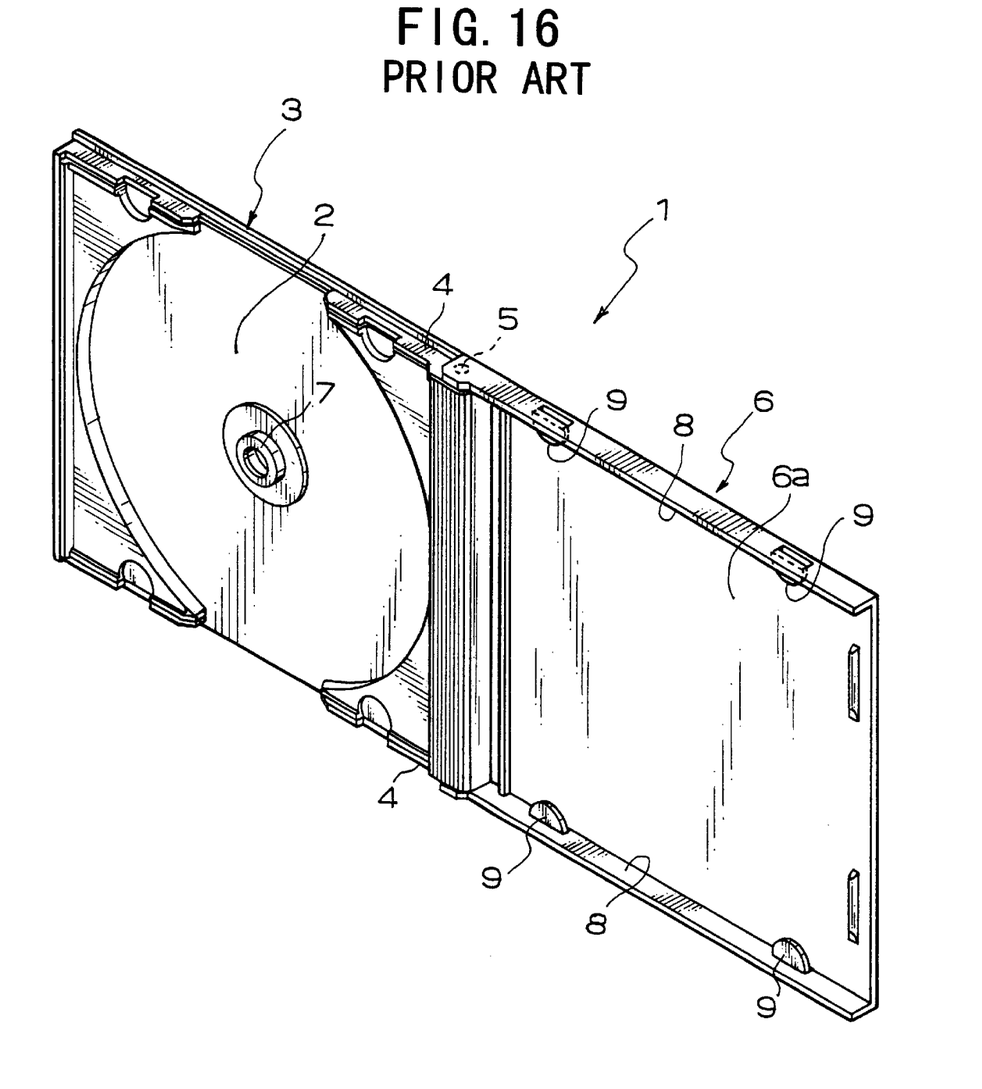
FIG. 16 is a perspective view of a conventional CD casing.

Referring to FIG. 16, a CD casing 1 is made of a synthetic resin material, comprising a case housing 3 having a circular disc container section 2 formed therein and a cover 6 rotatably attached to the case housing 3 by inserting hinge pins 5 in the holes made in the upper and lower ends 4 of the case housing 3.

The circular disc container section 2 has a cylindrical projection 7 formed at its center. The cylindrical projection 7 is somewhat resilient, permitting a CD to be held by inserting the cylindrical projection 7 in the center circular hole of the CD.

As seen from the drawing, the cover 6 has tongue-like projections 9 formed on its opposite longitudinal walls 8, thus defining small gaps between the tongue-like projections 9 and the inner surface 6a of the cover 6 for removably holding a booklet, which describes the contents of the CD.

Such a CD casing 1 of synthetic resin, however, prevents the title of the CD, ornamental patterns, the words of the recorded song or any other pieces of information from being printed on the CD casing.

The space available for holding a booklet is relatively small, and accordingly, the booklet size is limited. The booklet is prone to be lost because it is a separate object.

It is required that the synthetic material when disposed of, be separated from paper or other combustible waste. Use of such incombustible material is a significant cause for environmental pollution, and therefore, should be refrained to possible extent.

SUMMARY OF THE INVENTION

One object of the present invention is to provide a CD casing which permits the printing thereon, and is capable of containing as much information as required without the fear of losing the same, causing no environmental pollution problem when disposed of by combustion.

To attain this object a book-like disc casing according to the present invention comprises a series of a front cover, a spine and a rear cover, made of cardboard, and a plurality of pieces of paper, the front cover, spine and rear cover being folded to be like a book with the pieces of paper interleaved between the front cover and the rear cover, at least one of the front and rear covers having an intermediate member and a lining member laid on each other to form a lamination inside, the intermediate member having a disc-accommodating space formed therein, and the lining member having a line of perforations and creases intercepting the line of perforations, which is partly in conformity with the contour of the disc accommodating space, thereby facilitating the making of an opening in the lining member to permit the taking-out of the disc from the disc accommodating space.

The part of the lining member defined by the line of perforations when cut open therealong, provides a flap which can be folded to turn about the creases, which have a catch projection integrally connected thereto, permitting the catch projection to catch and raise the disc when the flap is made to turn for opening.

The disc accommodating space is of polygonal form, the inner sides of which are tangential to the circumference of the disc to be contained.

The flap provided by the lining member has a window formed therein to permit confirmation of the disk being contained by sight.

The pieces of paper may bear pieces of information pertaining to the contents of the disc, decorative patterns, and blanks for notes.

Other objects and advantages of the present invention will be understood from the following description of CD casings according to some preferred embodiments of the present invention, which are shown in accompanying drawings.

DETAILED DESCRIPTION OF PREFERRED EMBODIMENT

Figure 1:
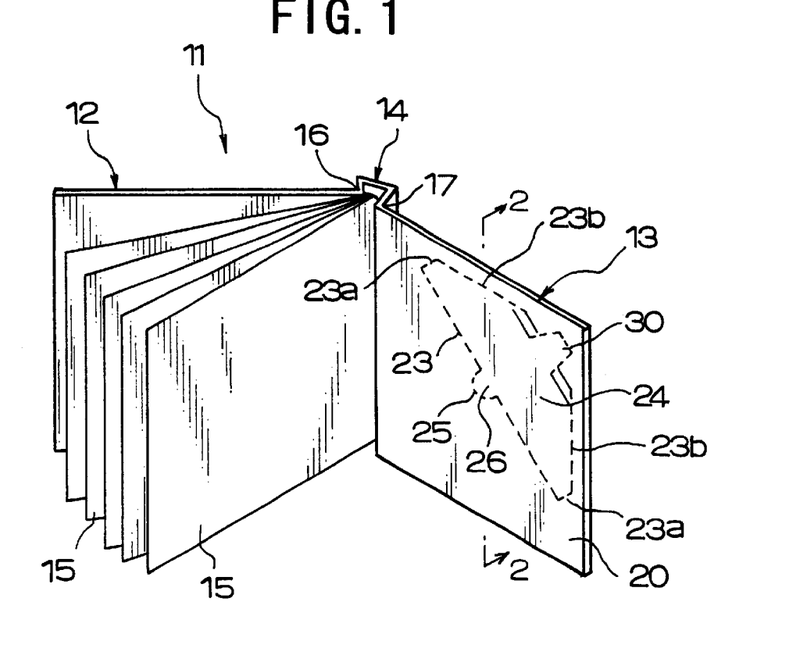
FIG. 1 is a perspective view of a CD casing according to a first embodiment.
Figure 2:
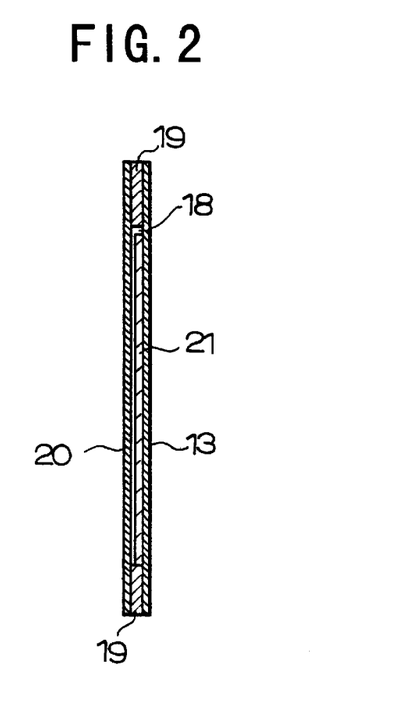
FIG. 2 is a sectional view taken along the line 2—2 in FIG. 1.

Referring to FIGS. 1 to 5, a book-like disc casing 11 according to the first embodiment of the present invention comprises a series of a front cover 12, a spine 14 and a rear cover 13, made of cardboard, and a plurality of pieces of paper 15 interleaved between the front and rear covers 12 and 13. As shown in FIG. 1, the front cover 12, the spine 14 and the rear cover 13 are folded to be like a book with the pieces of paper 15 interleaved between the front cover 12 and the rear cover 13.

The spine 14 has two hinge sections 16 integrally connected to its opposite sides. The square front cover 12 is integrally connected to the spine 14 via one hinge section 16 whereas the rear cover 13 is integrally connected to the spine 14 via the other hinge section 17. Thus, the front and rear covers 12 and 13 are foldable on each other, turning toward each other about the spine 14.

Figure 3:
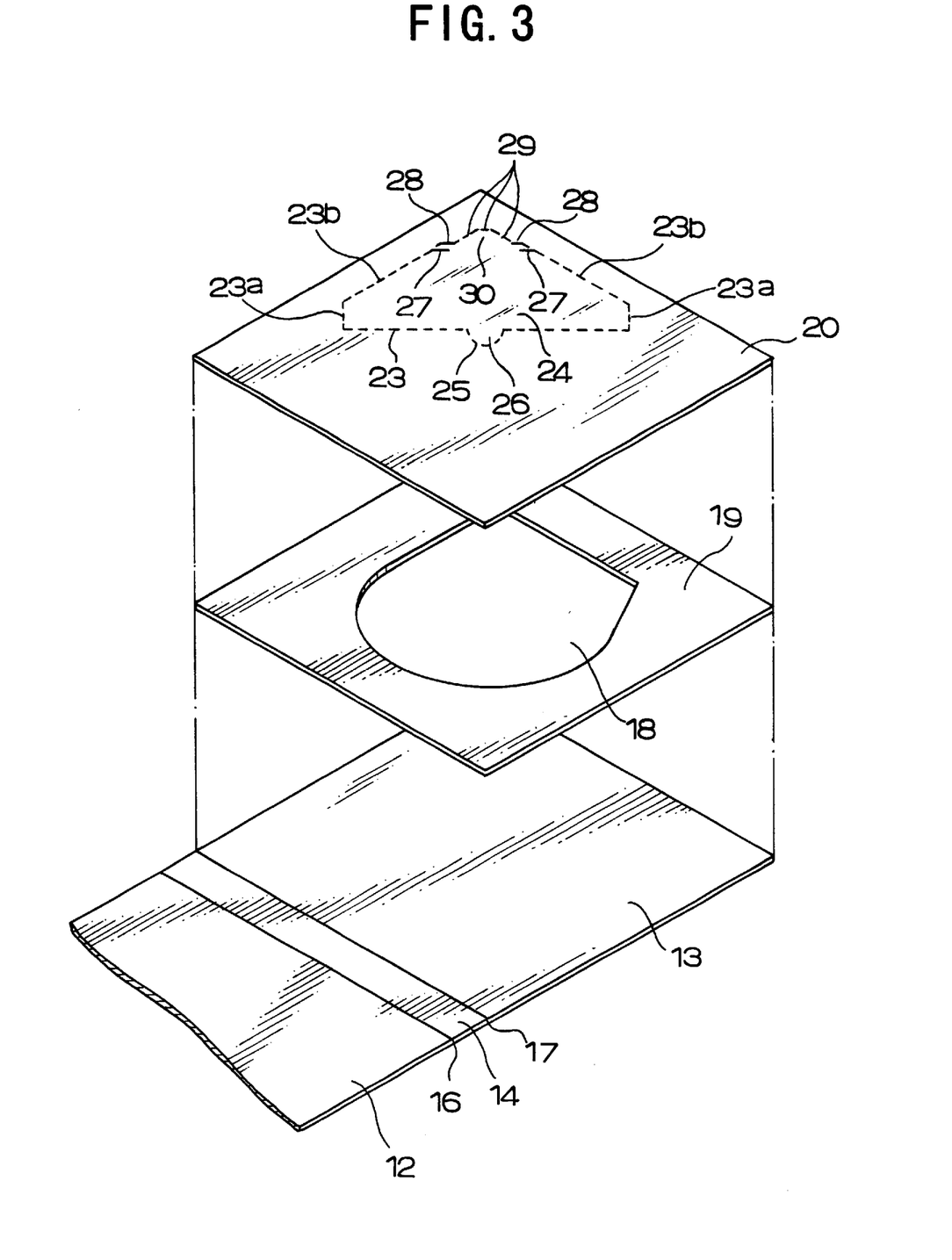
FIG. 3 is an exploded view of the front cover.
Figure 4:
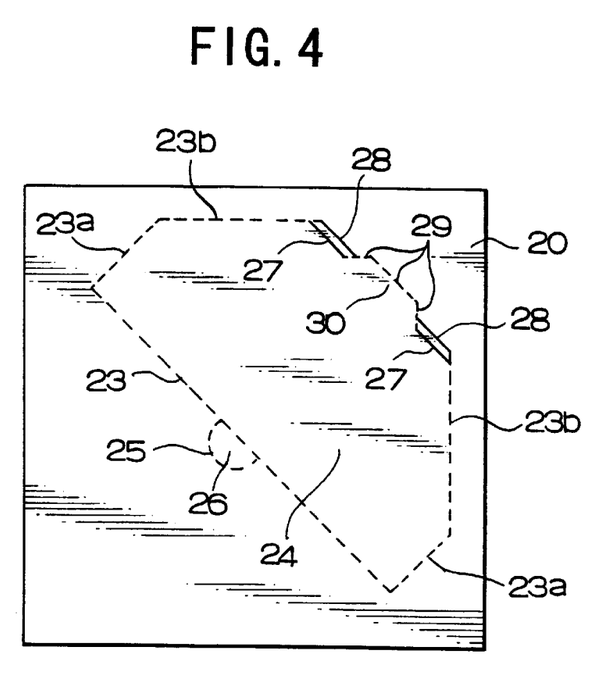
FIG. 4 is a plane view of the rear cover, showing the inside of the rear cover.
Figure 5:
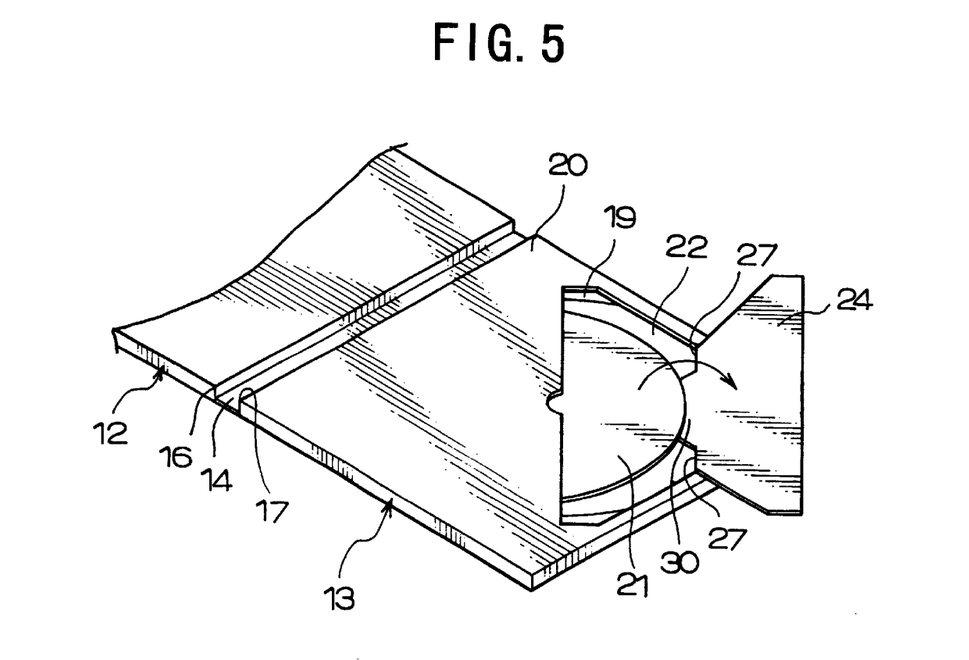
FIG. 5 is a perspective view of the front cover, showing how it is like when the flap is opened.

Referring to FIG. 3, the rear (or front) cover 13 has a square intermediate member 19 and a square lining member 20 laid on each other to form a lamination on the inside of the rear cover 13. The intermediate member 19 has a disc accommodating space 18 formed therein, thus permitting a CD 21 to be contained therein. The rear cover 13, intermediate member 19 and lining member 20 are laid on each other, and bonded together to form a lamination as seen from FIG. 2. The disc accommodating space 18 may be circular or polygonal in shape. In any event the disc accommodating space must be large enough to accommodate a CD therein no matter what shape the space may take.

The lining member 20 has a series of linear sections of perforations, and two parallel-creases 27 and 28 intercepting the converging linear sections of perforations 23b. The linear sections of perforations 23, 23a and 23b are partly in conformity with the disc accommodating space 18, thereby facilitating the cutting and opening of the corresponding part of the lining member 20 to permit the taking-out of the CD 21 from the disc accommodating space 18 of the intermediate member 19.

As seen from FIG. 3, a semicircular line of perforations 25 is made at the center of the linear section of perforations 23 to define a finger-insertion hole 26 when the semicircular line of perforations 25 is cut and removed.

As shown, one parallel-crease 27, 28 is formed on one side each of the converging linear sections of perforations 23b and 23b, intercepting the converging linear section.

Also, a trapezoid section of perforations 29 is contiguous to the parallel-creases 27, 28. This triangular section of perforations 29 provides a catch projection 30 to catch and raise the CD 21 when the flap 24 is made to turn for opening, as later described.

The interleaving pieces of paper 15 are square, and somewhat smaller than the front or rear cover 12 or 13. These pieces of paper 15 are laid on each other to be bonded together on their one sides to the inner surface of the rear cover 14. The interleaves 15 have the contents of the CD, the words of the songs, ornamental patterns or blanks for notes printed thereon.

To take out the CD 21 from the disc accommodating space 18 the rear cover 13 is opened wide, and the linear sections of perforations 23, 23a and 23b of the lining member 20 is pushed with the finger tip. Thus, the semi-circular patch 26 is removed, and the trapezoid section 29 is cut. The flap 24 is opened in the direction indicated by arrow to fold along the parallel-creases 27, 28. As the flap 24 is inclined in the direction indicated by arrow, the catch piece 30 is made to turn about the parallel-creases 27, 28 until the catch piece 30 has caught the circumferential edge of the CD 21 on its back, raising the CD to facilitate the taking-out of the CD with fingers (see FIG. 5).

Figure 6:
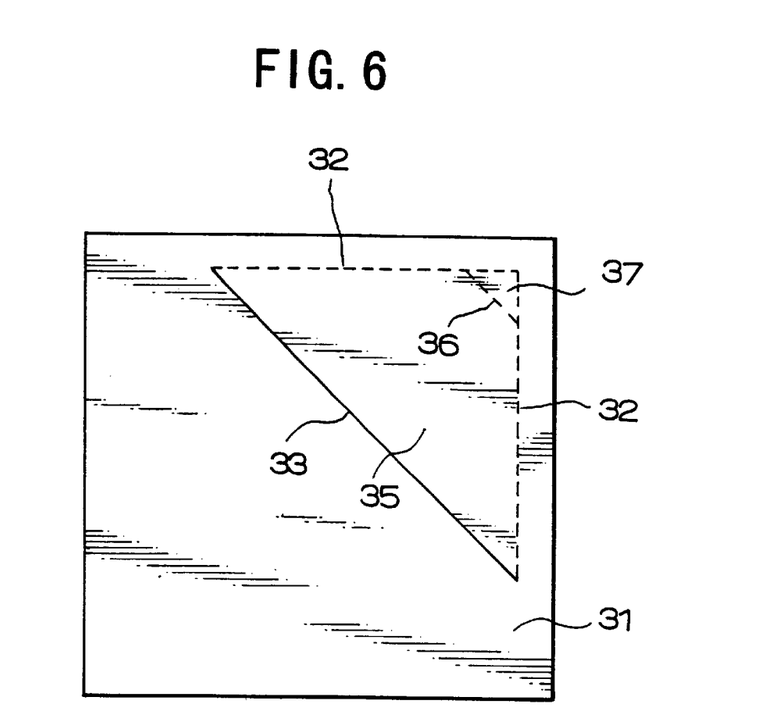
FIG. 6 is a plane view of the front cover of a CD casing according to a second embodiment, showing the inside of the front cover.
Figure 7:
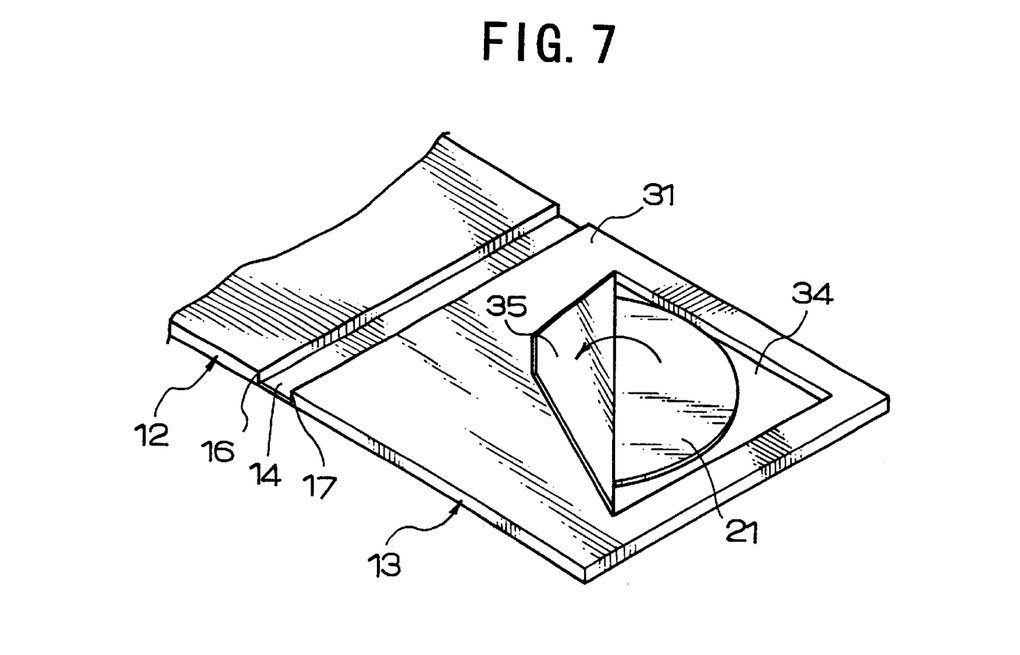
FIG. 7 is a perspective view of the CD casing of FIG. 6, showing how it is like when the flap is opened.

FIGS. 6 and 7 show a book-like disc casing according to the second embodiment. In these drawings same parts as the disc casing according to the first embodiment are indicated by same reference numerals as used in FIGS. 1 to 5, and their descriptions are omitted. The lining member 31 has two straight lines of perforations 32 and one straight crease 33 made therein. Thus, the two straight lines of perforations 32 and the single straight crease 33 forms an equilateral triangle. The equilateral triangle area defines the opening 34 and, at the same time, a flap 35 to close the opening 34.

The equilateral triangle area has a small equilateral triangle 37 defined at its top by a series of perforations 36. The small equilateral triangle 37 can be removed by cutting along the linear sections of perforations 32, 32 and 36.

To take out the CD 21 from the disc accommodating space 34 the rear cover 31 is opened wide, and the straight lines of perforations 32 and 32 of the lining member 31 are pushed with the finger tip. Thus, the small equilateral triangle 37 is removed, and the trapezoid flap 35 is formed. The trapezoid flap 35 can be opened in the direction indicated by arrow while folding along the straight crease 33. As the trapezoid flap 35 is inclined in the direction indicated by arrow, the CD 21 appears to be taken out from the disc accommodating space 34.

Figure 8:
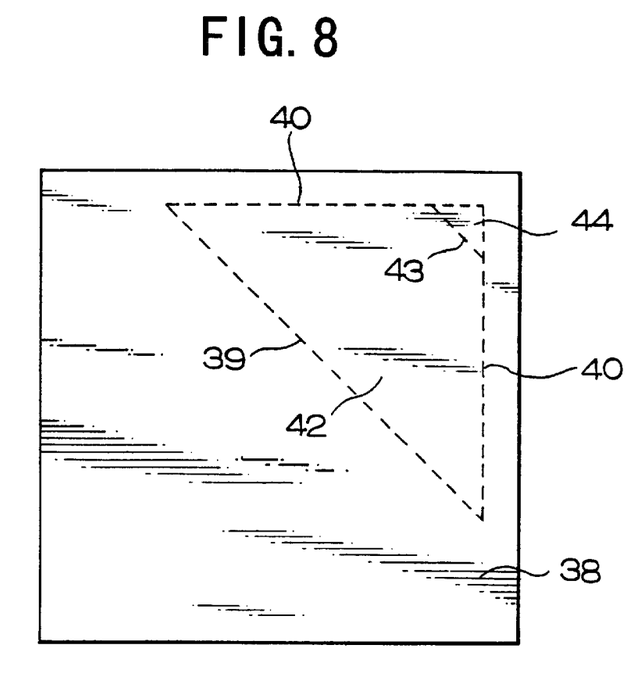
FIG. 8 is a plane view of the front cover of a CD casing according to a third embodiment, showing the inside of the front cover.
Figure 9:
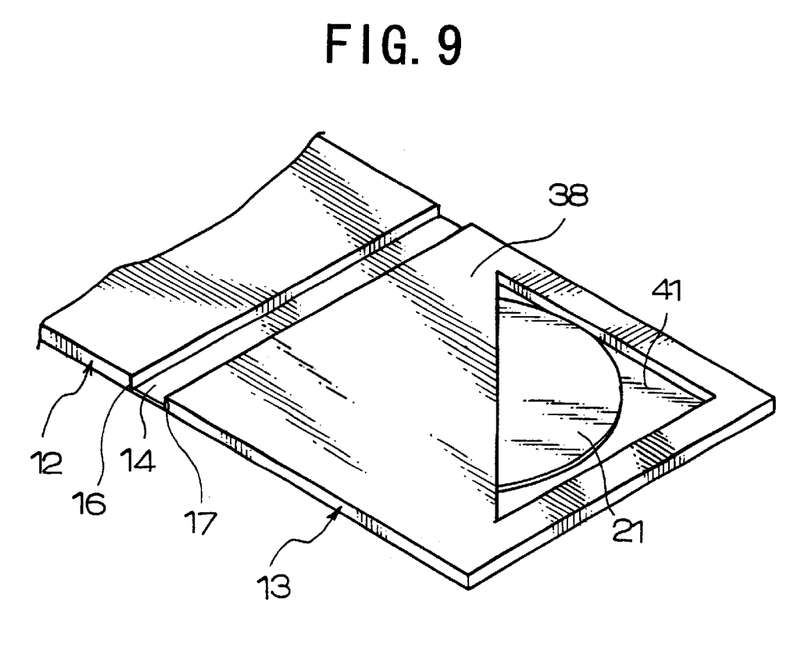
FIG. 9 is a perspective view of the CD casing of FIG. 8, showing how it is like when the casing is opened.

FIGS. 8 and 9 show a book-like disc casing according to the third embodiment. In these drawings same parts as the disc casing according to the first embodiment are indicated by same reference numerals as used in FIGS. 1 to 5, and their descriptions are omitted. The lining member 38 has three straight lines of perforations 39, 40 and 40 made in the form of equilateral triangle. The equilateral triangle 42 is cut along the straight lines of perforations 39, 40 and 40 to make the opening 41.

The equilateral triangle area 42 has a small equilateral triangle 44 defined at its top by perforations. The small equilateral triangle 44 can be removed by cutting along the perforations, so that a finger insertion hole may be made.

To take out the CD 21 from the disc accommodating space 41 the rear cover 13 is opened wide, and the straight lines of perforations 39 and 40 of the lining member 38 are pushed with the finger tip. Thus, the small equilateral triangle 44 is removed, and then the trapezoid section 42 is cut and removed by inserting the finger into the finger insertion hole and by pulling the trapezoid section 42 apart from the lining member 38. The CD 21 appears to be taken out from the disc accommodating space 41.

Figure 10:
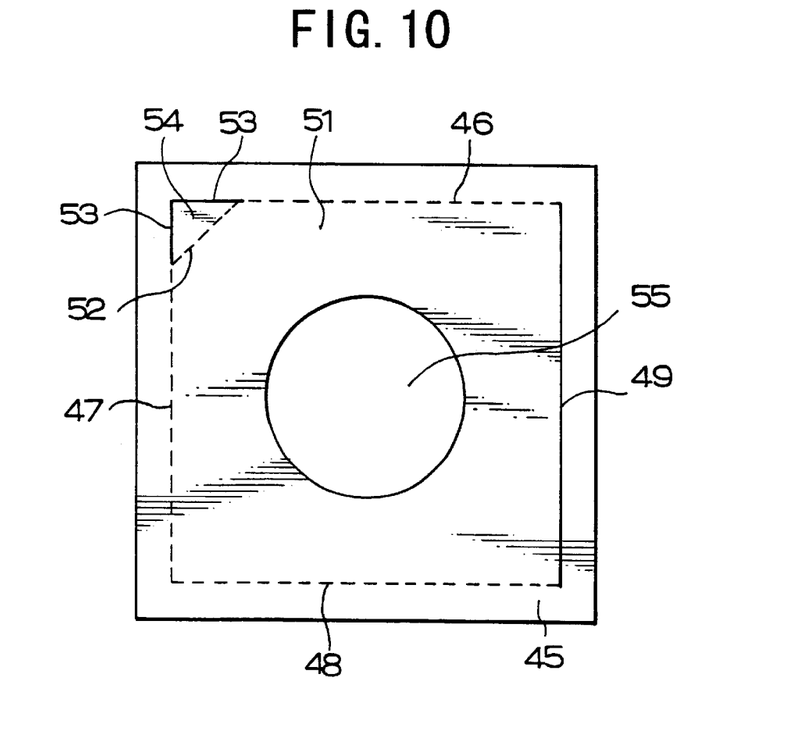
FIG. 10 is a plane view of the front cover of a CD casing according to a fourth embodiment, showing the inside of the front cover.
Figure 11:
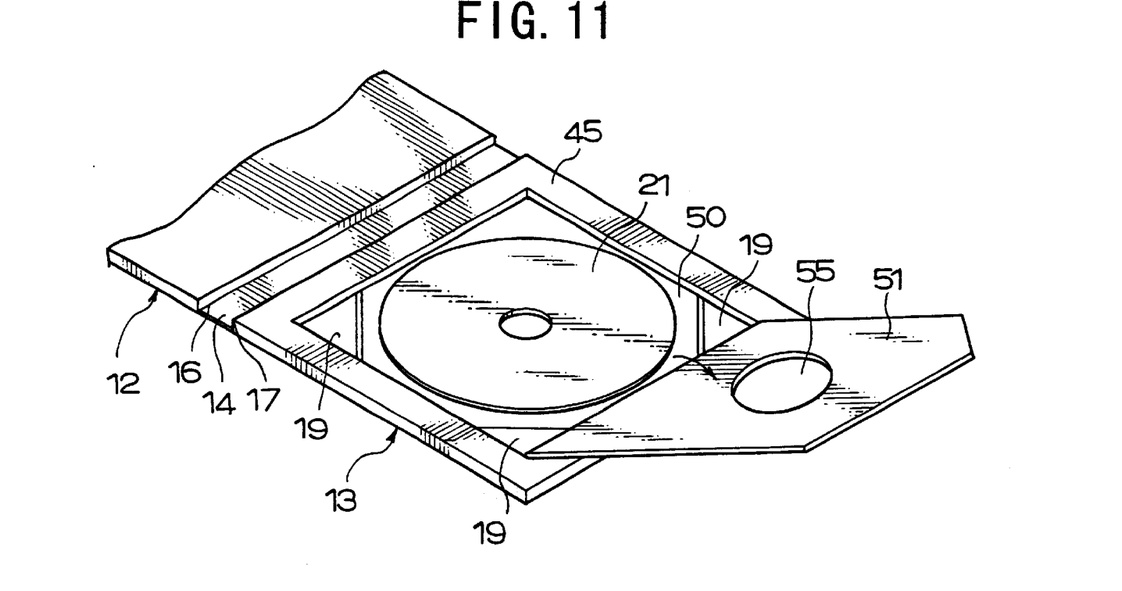
FIG. 11 is a perspective view of the CD casing of FIG. 10, showing how it is like when the flap is opened.

FIGS. 10 and 11 show a book-like disc casing according to the fourth embodiment. In these drawings same parts as the disc casing according to the first embodiment are indicated by same reference numerals as used in FIGS. 1 to 5, and their descriptions are omitted. The lining member 45 has three straight equal lines of perforations 46, 47 and 48 and one straight equal crease 49, thus forming four right angles. The square area defines the opening 50, and at the same time, a flap 51 to close the square opening 50.

The square area has a small equilateral triangle 54 defined at one corner by a short line of perforations 52. The small equilateral triangle 54 can be removed by cutting along the short line of perforations 52, thereby providing a finger insertion hole. Also, the square area has a circular window 55 made at its center to permit presence of the CD 21 to be confirmed by sight.

To take out the CD 21 from the disc accommodating space 50 the rear cover 13 is opened wide, and the three straight lines of perforations 46, 47 and 48 of the lining member 45 are pushed with the finger tip. Thus, the small equilateral triangle 54 is removed, and the three sides of the square section 51 are cut. The flap 51 can be opened in the direction indicated by arrow to fold about the straight crease 49, so that the CD 21 may appear to be taken out from the disc accommodating space 50.

Figure 12:
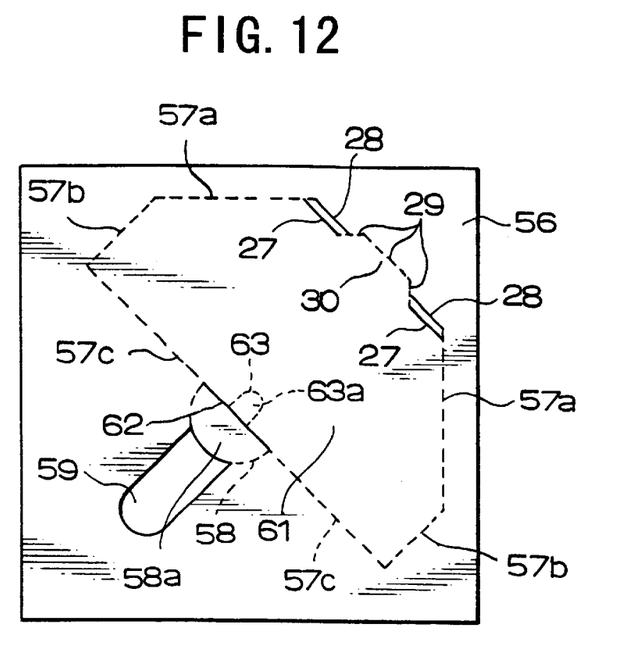
FIG. 12 is a plane view of the front cover of a CD casing according to a fifth embodiment, showing the inside of the front cover.
Figure 13:
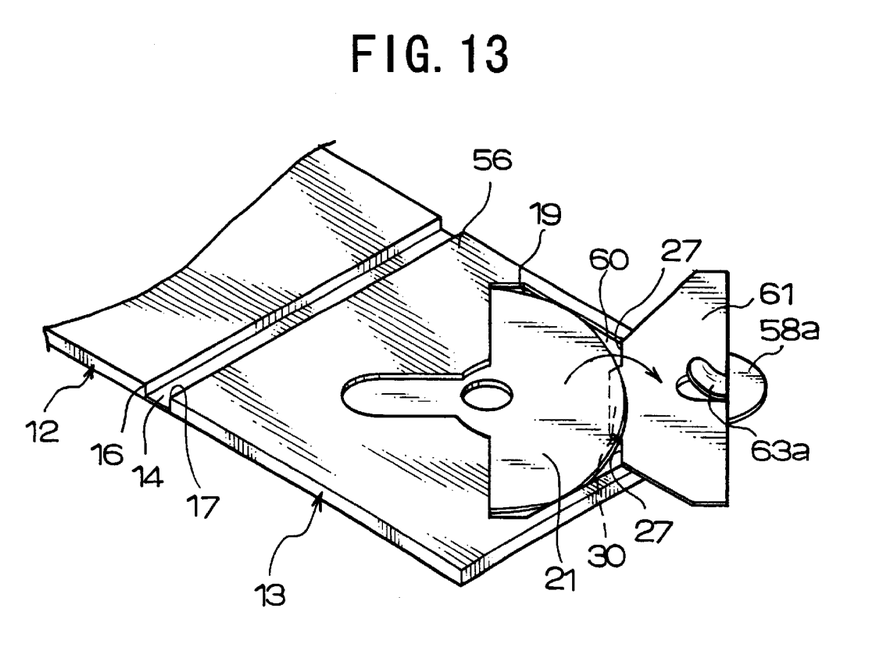
FIG. 13 is a perspective view of the CD casing of FIG. 12, showing how it is like when the flap is opened.

FIGS. 12 and 13 show a book-like disc casing according to the fifth embodiment. In these drawings same parts as the disc casing according to the first embodiment are indicated by same reference numerals as used in FIGS. 1 to 5, and their descriptions are omitted. The lining member 56 has linear sections of perforations 57a, 57b, 57c and 58 and an elongated hole 59 made therein. Like the first embodiment two parallel-creases 27, 28 are formed between the converging ends of the linear sections of perforations 57a and 57a, and a short linear section of perforations 29 is formed to bridge the confronting ends of the opposite parallel-creases 27, 28. The short linear section of perforations 29 defines a trapezoid catch piece 30 for catching and raising the circumferential edge of the CD 21 on its rear side. A short linear crease 62 is formed between the opposite linear sections of perforations 57c, and a small arch-like section of perforations 63 is formed inward, extending inside from the short linear crease 62. Two semicircular arc lines of perforations 58 are formed between the short linear crease 62 and the elongated hole 59.

The area surrounded by the linear sections of perforations 57a, 57b, 57c, 58 and 29, and by the opposite parallel-creases 27 and 28 defines an opening 60, and at the same time, a flap 61 to close the opening 60. The opening 60 is contiguous to the elongated hole 59 via the semicircular arch-like extensions. As best seen from FIG. 13, a finger-pinching piece 58a is integrally connected to a tongue piece 63a via the short crease 62, thus facilitating the bending of the finger-pinching piece 58a when the flap 61 is opened.

The disc accommodating space takes an octagonal shape, the eight sides of which are tangential with the circular circumference of the CD, thus holding the CD tight in its inner space.

To take out the CD 21 from the disc accommodating space 18 the rear cover 13 is opened wide, and the straight linear sections of perforations 57a, 57b, 57c, 58, 29 and 63 of the lining member 56 are pushed with the finger tip. The tongue piece 63a is pushed down apart from the flap 61, and the flap 61 is opened in the direction indicated by arrow to fold about the opposite creases 27 and 28 by pulling the finger-pinching piece 58a upward. Like the first embodiment, the CD is caught by the trapezoid catch piece 30 to be raised, thereby facilitating the taking-out of the CD as seen from FIG. 13.

Figure 14:
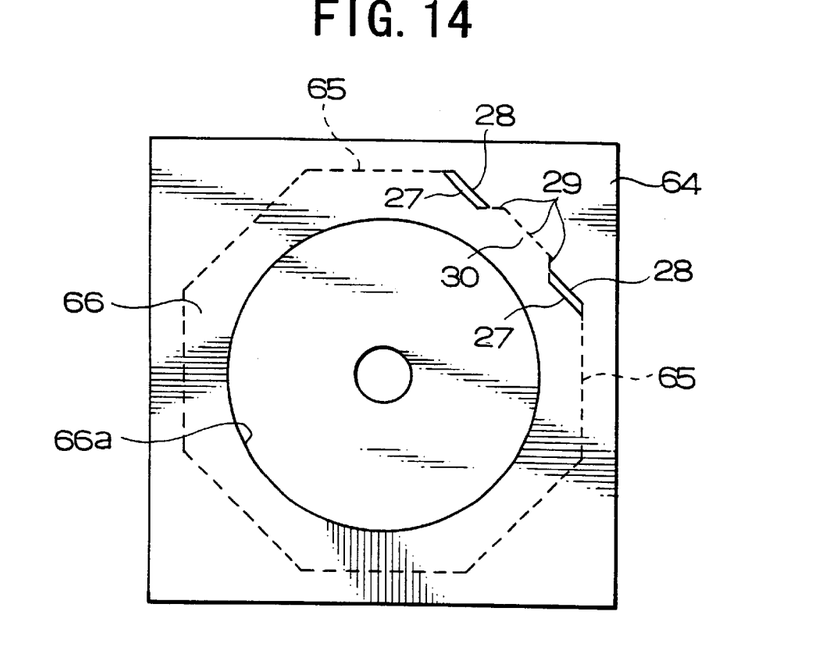
FIG. 14 is a plane view of the front cover of a CD casing according to a sixth embodiment, showing the inside of the front cover.
Figure 15:
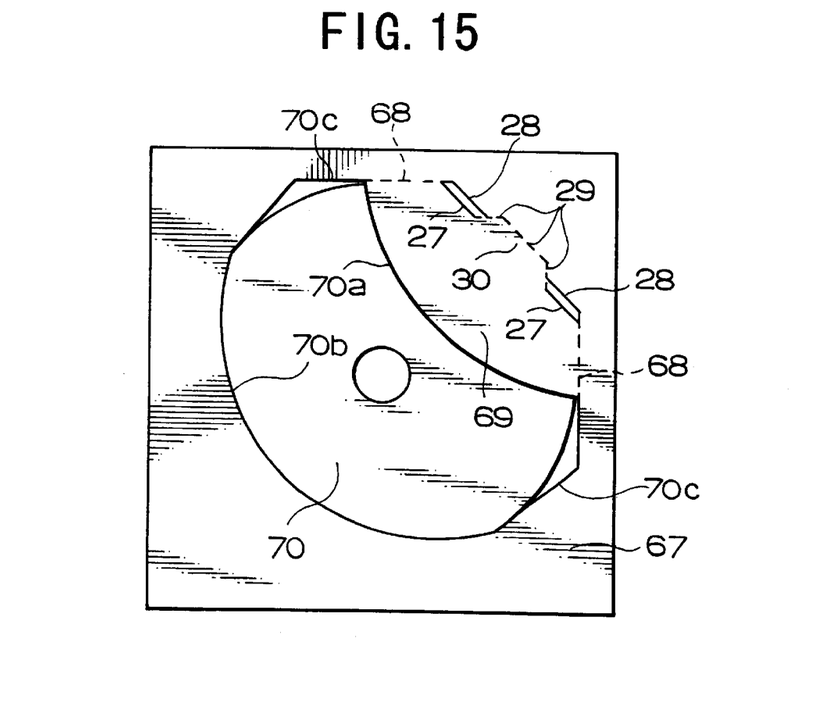
FIG. 15 is a plane view of the front cover of a CD casing according to a seventh embodiment, showing the inside of the front cover.

FIGS. 14 and 15 show book-like disc casings according to the sixth and seventh embodiments. Their disc accommodating spaces take an octagonal shape, the eight sides of which are tangential with the circular circumference of a CD, thus holding the CD tight in its inner space, like the fifth embodiment. In these drawings same parts as the disc casing according to the fifth embodiment are indicated by same reference numerals as used in FIGS. 12 and 13, and their descriptions are omitted.

As seen from FIG. 14, the disc casing according to the sixth embodiment has an octagonal line of perforations 65 made in its lining 64. The octagonal line of perforations 65 is in conformity with the eight sides of the underlying octagonal space. The flap 66, which is provided by cutting the octagonal line of perforations 65, has a large circular window 66a made therein, permitting presence of the CD inside to be confirmed by sight.

As seen from FIG. 15, the disc casing according to the seventh embodiment has two linear sections of perforations 68 and 68 each extending one half of one side of the octagon. These linear sections of perforations 68 and 68 are contiguous to a minor circular arc-cutting line 70a so that a sector flap 69 may be provided by cutting the linear sections of perforations 68 and 68. A major circular arc-cutting line 70b is contiguous to the minor circular arc-cutting line 70a through straight cutting lines 70c formed along the sides of the underlying octagonal space, thus making a crescent-shaped window 70 when the lining member 67 is cut along the minor and major circular arc-cutting lines 70a and 70b as well as the straight cutting lines 70c.

The disc casings according to some preferred embodiments of the present invention are described above as containing a CD, but these casing can be equally applied to LD and information mediums other than the CD.

What is claimed is:

1. A disc casing comprising a series of a front cover, a spine and a rear cover, and a plurality of sheets, the front cover, spine and rear cover being folded with the sheets interleaved between the front cover and the rear cover, at least one of the front and rear covers having an intermediate member and a lining member laid on each other to form a lamination inside, the intermediate member having a disc accommodating space formed therein, and the lining member having a line of perforations and creases intercepting the line of perforations, which is partly in conformity with the disc accommodating space, thereby facilitating the making of an opening in the lining member to permit the taking-out of the disc from the disc accommodating space wherein the part of the lining member defined by the line of perforations when cut open therealong provides a flap which can be folded to turn about the creases, which have a catch projection integrally connected thereto, thereby permitting the catch projection to catch and raise the disc when the flap is made to turn for opening.

2. A disc casing according to claim 1 wherein the disc accommodating space is of polygonal form, the inner sides of which are tangential to the circumference of the disc to be contained.

3. A casing according to claim 2 wherein the flap provided by the lining member has a window formed therein to permit confirmation of the disk being contained by sight.

4. A disc casing as in one of claims 1 to 3 wherein the sheets have information pertaining to the contents of the disc, decorative patterns, and blanks for notes.

* * * * *